United States Patent
Wang et al.

(10) Patent No.: US 12,327,115 B2
(45) Date of Patent: Jun. 10, 2025

(54) ARTIFICIAL INTELLIGENCE CHIP, ACCELERATOR AND OPERATION METHOD

(71) Applicant: Shenzhen Corerain Technologies Co., Ltd., Guangdong (CN)

(72) Inventors: Jiadong Wang, Guangdong (CN); Xinyu Niu, Guangdong (CN); Kuen Hung Tsoi, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 274 days.

(21) Appl. No.: 18/183,178

(22) Filed: Mar. 14, 2023

(65) Prior Publication Data

US 2023/0325184 A1    Oct. 12, 2023

(30) Foreign Application Priority Data

Apr. 11, 2022 (CN) .......................... 202210373966.4

(51) Int. Cl.
*G06F 9/345* (2018.01)
*G06F 9/30* (2018.01)

(52) U.S. Cl.
CPC ............ *G06F 9/3001* (2013.01); *G06F 9/345* (2013.01)

(58) Field of Classification Search
None
See application file for complete search history.

(56) References Cited

U.S. PATENT DOCUMENTS

| | | | |
|---|---|---|---|
| 2010/0223514 A1* | 9/2010 | Nara | G11C 29/12015 714/719 |
| 2020/0293284 A1* | 9/2020 | Vantrease | G06N 3/08 |
| 2021/0149677 A1* | 5/2021 | Maiyuran | G06F 9/3013 |
| 2023/0029798 A1* | 2/2023 | Lee | G11C 5/143 |
| 2023/0177321 A1* | 6/2023 | Sanchez | G06N 3/063 706/33 |

* cited by examiner

*Primary Examiner* — Michael Sun

(57) ABSTRACT

The present disclosure provides an artificial intelligence chip, an accelerator and an operation method, relating to the technical field of artificial intelligence, the chip comprising: a first operation circuit configured to execute a first operation to output a first operation result; a second operation circuit connected in parallel with the first operation circuit and configured to execute a second operation identical to the first operation to output a second operation result; and a third operation circuit configured to, upon receiving the first operation result and the second operation result, execute a third operation different from the first operation on the first operation result and the second operation result, respectively, to output a third operation result, respectively.

18 Claims, 7 Drawing Sheets

ARTIFICIAL INTELLIGENCE CHIP, ACCELERATOR AND OPERATION METHOD

CROSS REFERENCE TO RELATED APPLICATIONS

The present application claims the benefit of Chinese Patent Application No. 202210373966.4 filed on Apr. 11, 2022, the contents of which are incorporated herein by reference in their entirety.

TECHNICAL FIELD

The present disclosure relates to the technical field of artificial intelligence, and more particularly to an artificial intelligence chip, an accelerator and an operation method.

BACKGROUND

Artificial intelligence is a technical science that studies intelligence for modeling, extending, and expanding humans. At present, the research on artificial intelligence involves robot, language recognition, image recognition and natural language processing.

Artificial neural network is a common algorithm of artificial intelligence, and convolution operation, dot multiplication dot addition operation and activation function operation are often used in the operation of artificial neural network.

SUMMARY

According to an aspect of an embodiment of the present disclosure, there is provided an artificial intelligence chip comprising: a first operation circuit configured to execute a first operation to output a first operation result; a second operation circuit connected in parallel with the first operation circuit and configured to execute a second operation identical to the first operation to output a second operation result; and a third operation circuit configured to, upon receiving the first operation result and the second operation result, execute a third operation different from the first operation on the first operation result and the second operation result, respectively, to output a third operation result, respectively.

In some embodiments, the artificial intelligence chip further comprises: a first data allocator comprising: A first input end, a first output end and a second output end, the first input end being configured to receive the second operation result, the first output end being connected to the third operation circuit; a fourth operation circuit connected to the second output end and configured to, upon receiving the second operation result, execute a fourth operation on the second operation result to output a fourth operation result, the fourth operation being identical to the third operation; and the third operation circuit being further configured to execute the third operation on the first operation result if only the first operation result is received.

In some embodiments, the artificial intelligence chip further comprises: a second data allocator connected between the first operation circuit and the third operation circuit and comprising a second input end, a third output end and a fourth output end, the second input end being configured to receive the first operation result; a first processing circuit connected between the second data allocator and the third operation circuit, configured to receive the first operation result from the third output end and the second operation result from the first output end in one clock cycle, and respectively output the first operation result and the second operation result to the third operation circuit in two clock cycles; and a first data selector connected between the first processing circuit and the third operation circuit, comprising a third input end, a fourth input end and a fifth output end, the third input end being connected to the first processing circuit, the fourth input end being connected to the fourth output end, and the fifth output end being connected to the third operation circuit.

In some embodiments, the artificial intelligence chip further comprises: a third data allocator comprising: a fifth input end, a sixth output end and a seventh output end, the fifth input end being configured to receive the third operation result; a second processing circuit configured to receive the third operation result from the seventh output end and the fourth operation result from the fourth operation circuit in one clock cycle, and output the third operation result and the fourth operation result respectively in two clock cycles, or output the third operation result and the fourth operation result synchronously in one clock cycle; and a second data selector comprising a sixth input end, a seventh input end and an eighth output end, the sixth input end being connected to the sixth output end, the seventh input end being configured to receive the third operation result and the fourth operation result output by the second processing circuit.

In some embodiments, the artificial intelligence chip further comprises: a fourth data allocator comprising an eighth input end, a ninth output end and a tenth output end, the eighth input end being configured to receive the fourth operation result, the tenth output end being connected to an end, close to the third data allocator, of the second processing circuit.

In some embodiments, the artificial intelligence chip further comprises: a fifth operation circuit connected between the third operation circuit and the fourth operation circuit and configured to execute a fifth operation on the third operation result to output a fifth operation result, the fifth operation being different from the first operation and different from the third operation; a third data selector connected between the fifth operation circuit and the fourth operation circuit, and comprising a ninth input end, a tenth input end and an eleventh output end, the ninth input end being configured to receive the fifth operation result, the tenth input end being configured to receive the second operation result, and the eleventh output end being connected to the fourth operation circuit; a fifth data allocator connected between the third operation circuit and the fifth operation circuit and comprising an eleventh input end, a twelfth output end and a thirteenth output end, the eleventh input end being configured to receive the third operation result, the thirteenth output end being connected to the fifth operation circuit; a fourth data selector comprising a twelfth input end, a thirteenth input end and a fourteenth output end, the twelfth input end being connected to the twelfth output end, the thirteenth input end being configured to receive the fourth operation result; and the fourth operation circuit being further configured to, upon receiving the fifth operation result, execute the fourth operation on the fifth operation result to output the fourth operation result.

In some embodiments, the first operation is one of a first type of operation and a second type of operation, the fifth operation is the other of the first type of operation and the second type of operation, the third operation is an activate function operation, the first type of operation is a convolution operation, and the second type of operation comprises at least one of a dot multiply operation and a dot add operation.

In some embodiments, the first operation is the first type of operation and the fifth operation is the second type of operation.

According to another aspect of embodiments of the present disclosure, there is provided an artificial intelligence accelerator comprising: an artificial intelligence chip as in any preceding embodiment.

According to another aspect of an embodiment of the present disclosure, there is provided an operation method of an artificial intelligence chip, the artificial intelligence chip comprising a first operation circuit, a second operation circuit and a third operation circuit, the method comprising: the first operation circuit executing a first operation to output a first operation result; the second operation circuit executing a second operation identical to the first operation to output a second operation result, and the second operation circuit being connected in parallel with the first operation circuit; and the third operation circuit, upon receiving the first operation result and the second operation result, executing a third operation different from the first operation on the first operation result and the second operation result, respectively, to output a third operation result, respectively.

In some embodiments, the artificial intelligence chip further comprises a first data allocator and a fourth operation circuit, the method further comprising: the first data allocator receiving the second operation result via a first input end and outputting the second operation result via a first output end or a second output end, and the first output end being connected to the third operation circuit; the fourth operation circuit, upon receiving the second operation result, executing a fourth operation on the second operation result to output a fourth operation result, the fourth operation being identical to the third operation, and the fourth operation circuit being connected to the second output end; and the third operation circuit executing the third operation on the first operation result when only the first operation result is received.

In some embodiments, the artificial intelligence chip further comprises a second data allocator, a first processing circuit and a first data selector, when the third operation circuit receives the first operation result and the second operation result, the method further comprises: the second data allocator receiving the first operation result via a second input end and outputting the first operation result via a third output end, the second data allocator being connected between the first operation circuit and the third operation circuit; the first processing circuit receives the first operation result from the third output end and the second operation result from the first output end in one clock cycle, and outputs the first operation result and the second operation result respectively in two clock cycles, and the first processing circuit being connected between the second data allocator and the third operation circuit; and the first data selector receiving the first operation result and the second operation result output from the first processing circuit via a third input end, and outputting the first operation result and the second operation result to the third operation circuit via a fifth output end.

In some embodiments, when the third operation circuit receives only the first operation result, the method further comprises: the second data allocator receiving the first operation result via a second input end and outputs the first operation result via a fourth output end. The first data selector receives the first operation result via a fourth input end and outputs the first operation result to the third operation circuit via the fifth output end.

In some embodiments, the artificial intelligence chip further comprises a third data allocator, a second processing circuit, and a second data selector, the method further comprising: the third data allocator receiving the third operation result via a fifth input end and outputting the third operation result via a sixth output end or a seventh output end; the second processing circuit receiving the third operation result from the seventh output end and the fourth operation result from the fourth operation circuit in one clock cycle, and outputting the third operation result and the fourth operation result respectively in two clock cycles, or outputting the third operation result and the fourth operation result synchronously in one clock cycle; and the second data selector receiving the third operation result from the sixth output end via a sixth input end or receiving the third operation result and the fourth operation result output from the second processing circuit via a seventh input end, and outputting same via an eighth output end of the second data selector.

In some embodiments, the artificial intelligence chip further comprises a fourth data allocator, the method further comprising: the fourth data allocator receiving the fourth operation result via an eighth input end, and outputting the fourth operation result via a ninth output end or a tenth output end, and the tenth output end being connected to one end, close to the third data allocator, of the second processing circuit.

In some embodiments, the artificial intelligence chip further comprises a fifth data allocator, a fifth operation circuit, a fourth data selector and a third data selector, the method further comprising: the fifth data allocator receiving the third operation result from the third operation circuit via an eleventh input end and outputting same via a twelfth output end or the thirteenth output end; the fifth operation circuit executing a fifth operation on the third operation result from the thirteenth output end to output a fifth operation result, the fifth operation being different from the first operation and different from the third operation; the third data selector receiving the fifth operation result from the fifth operation circuit via a ninth input end or receiving the second operation result from the second output end via a tenth input end, and outputting same to the fourth operation circuit via an eleventh output end; the fourth operation circuit, upon receiving the fifth operation result, executing the fourth operation on the fifth operation result to output the fourth operation result; and the fourth data selector receiving the third operation result from the twelfth output end via a twelfth input end or the fourth operation result from the fourth operation circuit via a thirteenth input end, and outputting same via a fourteenth output end.

In some embodiments, the first operation is one of a first type of operation and a second type of operation, the fifth operation is the other of the first type of operation and the second type of operation, the third operation is an activate function operation, the first type of operation is a convolution operation, and the second type of operation comprises at least one of a dot multiply operation and a dot add operation.

In some embodiments, the first operation is the first type of operation and the fifth operation is the second type of operation.

In the disclosed embodiment, the first operation circuit and the second operation circuit that execute the same operation may share a third operation circuit that executes another different operation, which can both satisfy the operation requirements and reduce power consumption.

The embodiments of the present disclosure are described in further detail below with reference to the accompanying drawings and examples.

BRIEF DESCRIPTION OF THE DRAWINGS

In order to more clearly illustrate the technical solutions in embodiments of the present disclosure or the prior art more clearly, a brief description will be given below with reference to the accompanying drawings which are used in the description of the embodiments or the prior art, and it is obvious that the drawings in the description below are only some embodiments of the present disclosure, and it would have been obvious for a person of ordinary skill in the art to obtain other drawings according to these drawings without involving any inventive effort.

DETAILED DESCRIPTION OF THE INVENTION

Now the technical solutions in the embodiments of the present disclosure will be described clearly and completely in combination with the drawings in the embodiments of the present disclosure. Apparently, the embodiments described are only a part of, not all of the present disclosure. Based on the embodiments in the present disclosure, all other embodiments obtained by a person of ordinary skill in the art without inventive effort fall within the scope of protection of the present disclosure.

The relative arrangement of parts and steps, numerical expressions and numerical values set forth in these examples are not limited to the scope of the disclosure unless specifically stated otherwise.

Also, it should be understood that the dimensions of the various parts illustrated in the figures are not drawn to scale for ease of description.

Techniques, methods, and devices known to one of ordinary skill in the relevant art may not be discussed in detail, but should be considered part of the written description where appropriate.

In all examples shown and discussed herein, any particular value should be interpreted as illustrative only and not as limiting. Thus, other examples of exemplary embodiments may have different values.

It should be noted that: like numbers and letters refer to like items in the following figures, and thus, once an item is defined in one figure, further discussion thereof is not required in subsequent figures.

Figure 1:
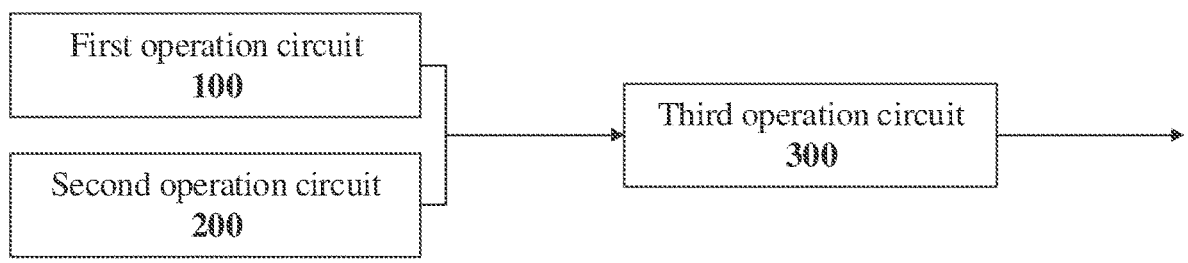
FIG. 1 is a schematic diagram of a structure of an artificial intelligence chip according to some embodiments of the present disclosure.

FIG. 1 is a schematic diagram of a structure of an artificial intelligence chip according to some embodiments of the present disclosure.

As shown in FIG. 1, the artificial intelligence chip 10 includes a first operation circuit 100, a second operation circuit 200, and a third operation circuit 300.

The first operation circuit 100 is configured to execute a first operation to output a first operation result. For example, the first operation is a convolution operation.

The second operation circuit 200 is connected in parallel with the first operation circuit 100 and is configured to execute a second operation identical to the first operation to output a second operation result. For example, the second operation is also a convolution operation.

The third operation circuit 300 is configured to, upon receiving the first operation result and the second operation result, execute a third operation different from the first operation on the first operation result and the second operation result, respectively, to output a third operation result, respectively. For example, the third operation is an activation function operation.

In the above-described embodiment, the first operation circuit 100 and the second operation circuit 200 that execute the same operation may share the third operation circuit 300 that executes another different operation, so that the operation requirements can be satisfied and the power consumption can be reduced.

In some embodiments, the first operation is one of a first type of operation and a second type of operation, and the third operation is an activate function operation. The first type of operation is a convolution operation and the second type of operation comprises at least one of a dot multiplication operation and a dot addition operation.

For example, the first operation is the first type of operation, i.e. a convolution operation.

For an operation scenario in which the activation function operation is executed after the convolution operation, the above-described embodiment can execute the convolution operation using the first operation circuit 100 and the second operation circuit 200, respectively, and then execute the activation function operation using the third operation circuit 300. Since the convolution operation is generally a down-sampling operation, executing the activation function operation using only the third operation circuit 300 can satisfy the operation requirements and also can reduce power consumption.

As another example, the first operation is the second type of operation, i.e. comprising at least one of a dot multiplication operation and a dot addition operation.

Figure 2:
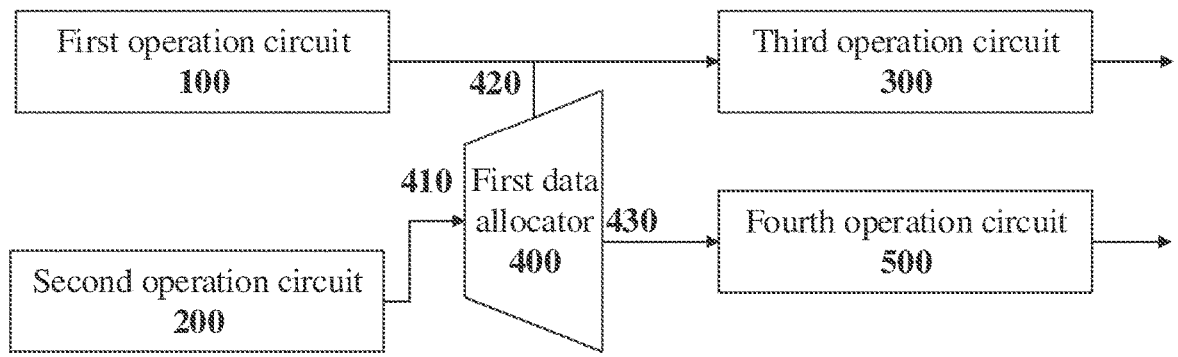
FIG. 2 is a schematic diagram of a structure of an artificial intelligence chip according to further embodiments of the present disclosure.

FIG. 2 is a schematic diagram of a structure of an artificial intelligence chip according to further embodiments of the present disclosure. Only the differences between the embodiment of FIG. 2 and the embodiment of FIG. 1 will be highlighted and reference will be made to the foregoing description.

In the embodiment shown in FIG. 2, the artificial intelligence chip 10 includes a first data allocator 400 and a fourth operation circuit 500 in addition to the first operation circuit 100, the second operation circuit 200, and the third operation circuit 300.

The first data allocator 400 includes a first input end 410, a first output end 420, and a second output end 430. The first input end 410 is connected to the second operation circuit 200 and is configured to receive a second operation result. The first output end 420 is connected to the third operation circuit 300, and the second output end 430 is connected to the fourth operation circuit 500.

The fourth operation circuit 500 is connected to the second output end 430 and configured to, upon receiving the second operation result, execute a fourth operation on the second operation result to output a fourth operation result, the fourth operation being identical to the third operation. For example, the fourth operation and the third operation are both activation function operations.

The third operation circuit 300 is further configured to execute a third operation on the first operation result if only the first operation result is received.

For example, when the second operation result received by the first input end 410 is output via the first output end 420, the third operation circuit 300 executes a third operation on the first operation result and the second operation result, respectively; in a case where the second operation result received by the first input end 410 is output via the second output end 430, the third operation circuit 300 executes a third operation on the first operation result.

In the above-described embodiment, the first operation circuit and the second operation circuit may share the function of the third operation circuit to reduce power consumption, or may respectively use the functions of the third operation circuit and the fourth operation circuit to improve computational performance. Such an artificial intelligence chip can meet different computational requirements.

For example, for a computational scenario requiring only a convolution operation and an activation function operation, different computational modes may be implemented by controlling the first data allocator 400. In an operation method, a convolution operation can be respectively executed by a first operation circuit 100 and a second operation circuit 200, and then an activation function operation can be executed by a third operation circuit 300; alternatively, the convolution operation may be executed by the first operation circuit 100 and the second operation circuit 200, respectively, and the activation function operation may be executed by the third operation circuit 300 and the fourth operation circuit 500, respectively.

Figure 3:
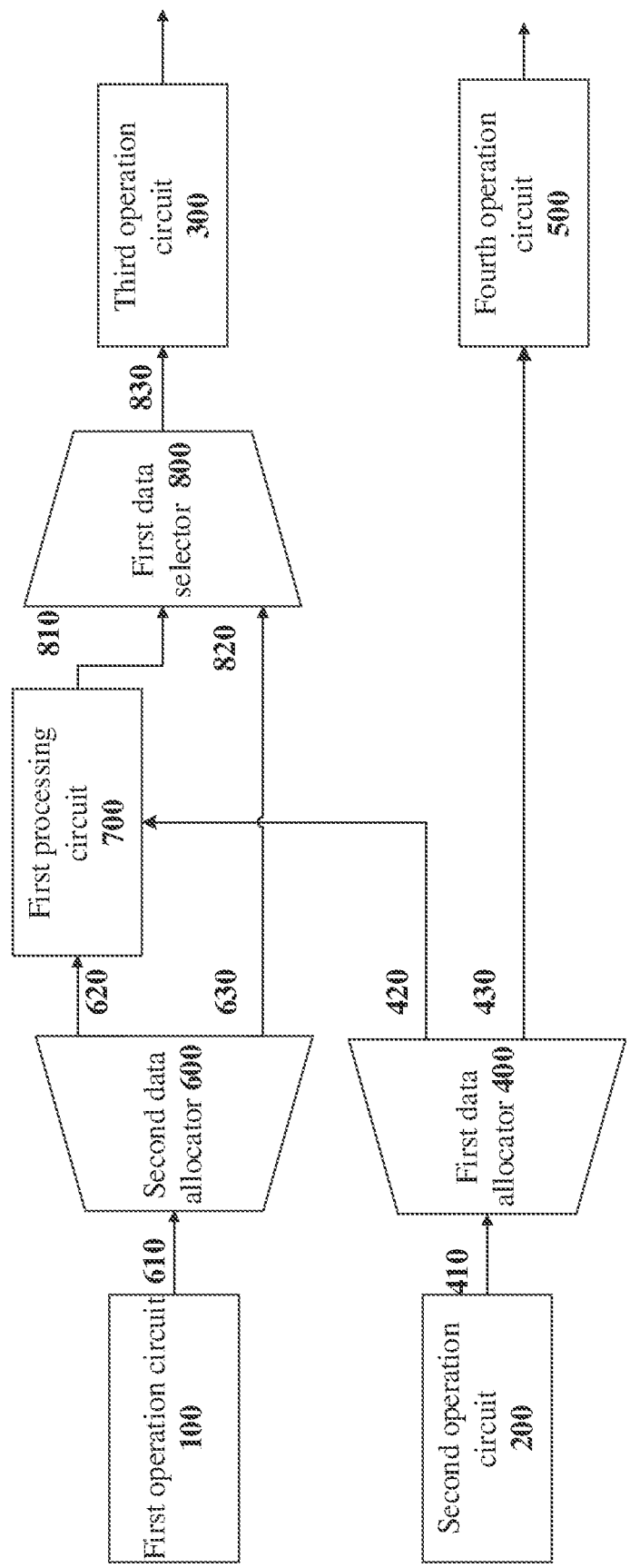
FIG. 3 is a schematic diagram of a structure of an artificial intelligence chip according to further embodiments of the present disclosure.

FIG. 3 is a schematic diagram of a structure of an artificial intelligence chip according to further embodiments of the present disclosure. Only the differences between the embodiment of FIG. 3 and the embodiment of FIG. 2 will be highlighted and reference will be made to the foregoing description.

In the embodiment shown in FIG. 3, in addition to the first operation circuit 100, the second operation circuit 200, the third operation circuit 300, the first data allocator 400, and the fourth operation circuit 500, the artificial intelligence chip 10 further comprises a second data allocator 600, a first processing circuit 700 and a first data selector 800.

The second data allocator 600 is connected between the first operation circuit 100 and the third operation circuit 300 and comprises a second input end 610, a third output end 620 and a fourth output end 630. The second input end 610 is configured to receive a first operation result from the first operation circuit 100. The third output end 620 is connected to the first processing circuit 700 and the fourth output end 630 is connected to the fourth input end 820 of the first data selector 800.

The first processing circuit 700 is connected between the second data allocator 600 and the third operation circuit 300. The first processing circuit 700 is configured to receive the first operation result from the third output end 620 and the second operation result from the first output end 420 in one clock cycle, and to output the first operation result and the second operation result to the third operation circuit 300 via the first data selector 800 in two clock cycles, respectively. For example, the first processing circuit 700 may receive a first operation result and a second operation result in one clock cycle, and may output the first operation result in a first one of the two clock cycles and the second operation result in a second one of the two clock cycles. The first processing circuit 700 is, for example, a data bit-width conversion circuit.

The first data selector 800 is connected between the first processing circuit 700 and the third operation circuit 300 and comprises a third input end 810, a fourth input end 820 and a fifth output end 830. The third input end 810 is connected to the first processing circuit 700, the fourth input end 820 is connected to the fourth output end 630, and the fifth output end 830 is connected to the third operation circuit 300.

In the above-mentioned embodiment, it is advantageous to provide the first processing circuit so that the third operation circuit can receive the first operation result and the second operation result in a certain order of precedence, which is advantageous to avoid data congestion, thus ensuring normal operation of the third operation circuit.

Figure 4:
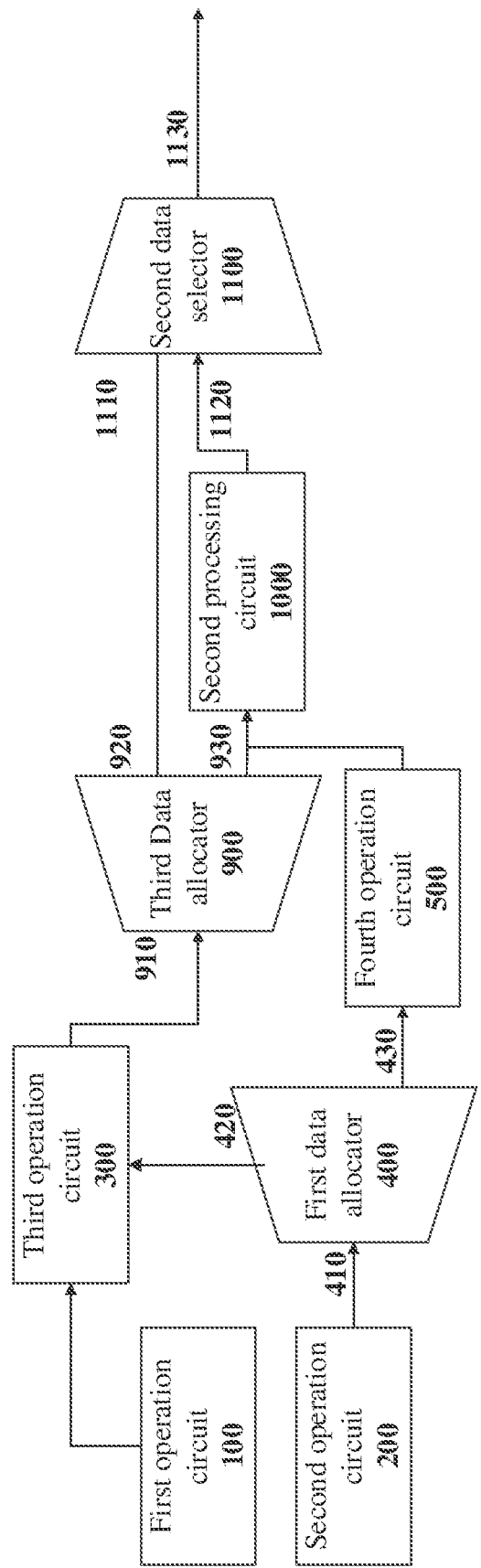
FIG. 4 is a schematic diagram of a structure of an artificial intelligence chip according to further embodiments of the present disclosure.

FIG. 4 is a schematic diagram of a structure of an artificial intelligence chip according to further embodiments of the present disclosure. Only the differences between the embodiment of FIG. 4 and the embodiment of FIG. 2 will be highlighted and reference will be made to the foregoing description.

In the embodiment shown in FIG. 4, in addition to the first operation circuit 100, the second operation circuit 200, the third operation circuit 300, the fourth operation circuit 500, and the first data allocator 400, the artificial intelligence chip 10 further includes a third data allocator 900, a second processing circuit 1000, and a second data selector 1100.

The third data allocator 900 comprises a fifth input end 910, a sixth output end 920 and a seventh output end 930. The fifth input end 910 is configured to receive the third operation result, the sixth output end 920 is connected to the sixth input end 1110 of the second data selector 1100, and the seventh output end 930 is connected to the second processing circuit 1000.

The second processing circuit 1000 is configured to receive the third operation result from the seventh output end 930 and the fourth operation result from the fourth operation circuit 500 in one clock cycle and output the third operation result and the fourth operation result respectively in two clock cycles, or to receive the third operation result from the seventh output end 930 and the fourth operation result from the fourth operation circuit 500 in one clock cycle and output the third operation result and the fourth operation result synchronously in one clock cycle. For example, the second processing circuit 1000 receives the third operation result and the fourth operation result in one clock cycle, and may output the third operation result in a first clock cycle of the two clock cycles and output the fourth operation result in a second clock cycle of the two clock cycles. As another example, the second processing circuit 1000 may receive the third operation result and the fourth operation result in one clock cycle, concatenate the third operation result and the fourth operation result, and synchronously output the third operation result and the fourth operation result in one clock cycle. The second processing circuit 1000 is, for example, a bit-width conversion circuit.

The second data selector 1100 comprises a sixth input end 1110, a seventh input end 1120 and an eighth output end 1130. The sixth input end 1110 is connected to the sixth output end 920, and the seventh input end 1120 is configured to receive the third operation result and the fourth operation result output by the second processing circuit 1000.

In the above-mentioned embodiments, by providing a second processing circuit, in some scenarios, the third operation result and the fourth operation result can be sent in a certain order of precedence, which is beneficial to avoid data congestion, thus ensuring the normal operation of an artificial intelligence chip; in other scenarios, the third operation result and the fourth operation result can be synchronously output, thereby maximizing the performance of the artificial intelligence chip.

Figure 5:
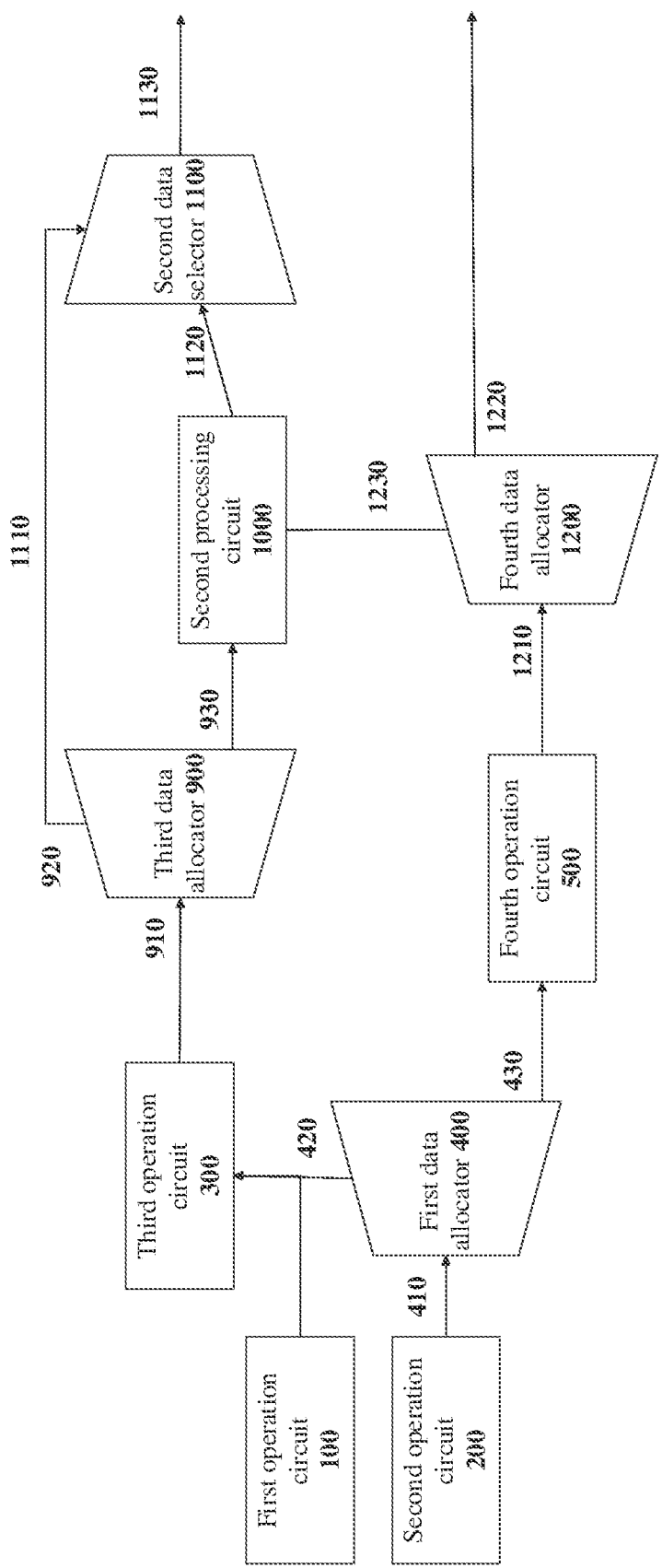
FIG. 5 is a schematic diagram of a structure of an artificial intelligence chip according to further embodiments of the present disclosure.

FIG. 5 is a schematic diagram of a structure of an artificial intelligence chip according to further embodiments of the present disclosure. Only the differences between the embodiment of FIG. 5 and the embodiment of FIG. 2 will be highlighted and reference will be made to the foregoing description.

In the embodiment shown in FIG. 5, the artificial intelligence chip 10 includes a fourth data allocator 1200 in addition to the first operation circuit 100, the second operation circuit 200, the third operation circuit 300, the fourth operation circuit 500, the first data allocator 400, the third data allocator 900, the second processing circuit 1000, and the second data selector 1100.

The fourth data allocator 1200 comprises an eighth input end 1210, a ninth output end 1220 and a tenth output end 1230. The eighth input end 1210 is configured to receive a fourth operation result from the fourth operation circuit 500, the ninth output end 1220 may directly output the fourth operation result, and the tenth output end 1230 is connected to one end, close to the third data allocator 900, of the second processing circuit 1000.

In the above-mentioned embodiments, the fourth data allocator can output the fourth operation result to the second processing circuit via the tenth output end, and can also directly output the fourth operation result via the ninth output end, further extending the operation function of the artificial intelligence chip.

Figure 6:
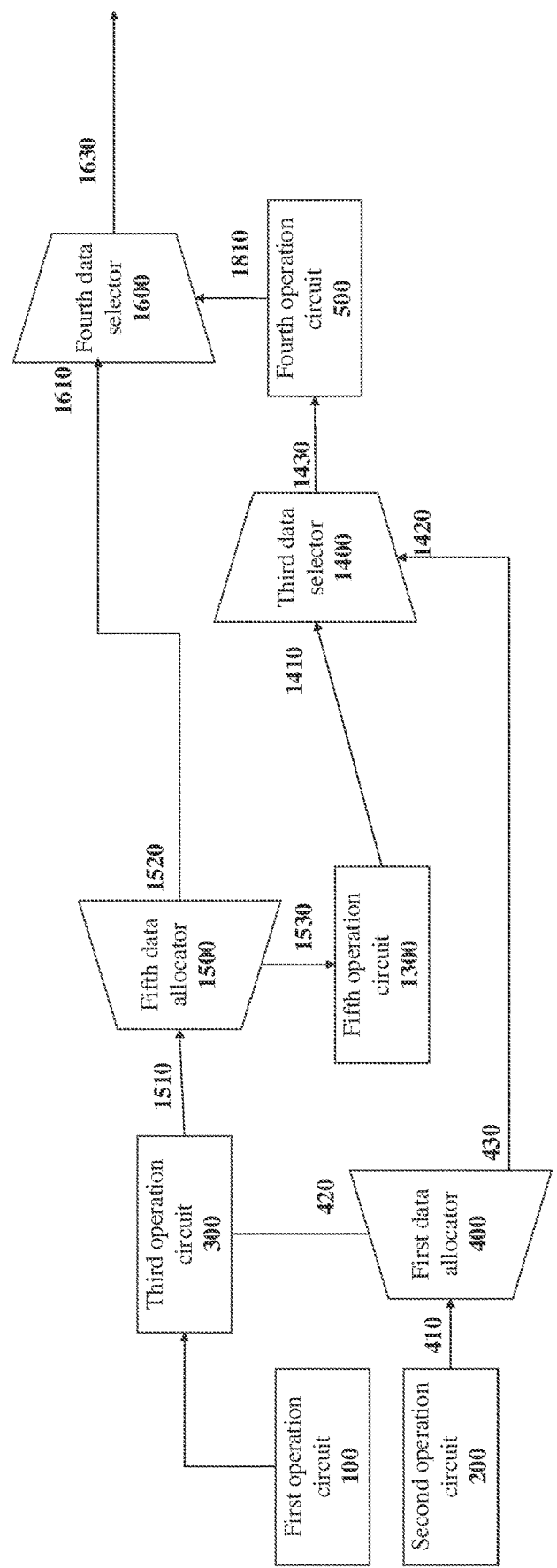
FIG. 6 is a schematic diagram of a structure of an artificial intelligence chip according to further embodiments of the present disclosure.

FIG. 6 is a schematic diagram of a structure of an artificial intelligence chip according to further embodiments of the present disclosure. Only the differences between the embodiment of FIG. 6 and the embodiment of FIG. 2 will be highlighted and reference will be made to the foregoing description.

In the embodiment shown in FIG. 6, in addition to the first operation circuit 100, the second operation circuit 200, the third operation circuit 300, the fourth operation circuit 500, and the first data allocator 400, the artificial intelligence chip 10 further includes a fifth operation circuit 1300, a third data allocator 1400, a fifth data allocator 1500, and a fourth data selector 1600.

The fifth operation circuit 1300 is connected between the third operation circuit 300 and the fourth operation circuit 500, and is configured to execute a fifth operation on the third operation result to output the fifth operation result. The fifth operation is different from the first operation and different from the third operation.

In some embodiments, the first operation is one of a first type of operation and a second type of operation, the fifth operation is the other of the first type of operation and the second type of operation, and the third operation is an activate function operation. Here, the first type of operation is a convolution operation, and the second type of operation includes at least one of a dot multiplication operation and a dot addition operation. For example, the fifth operation includes at least one of the dot multiplication operation and the dot addition operation; as another example, the fifth operation is a convolution operation.

The third data selector 1400 is connected between the fifth operation circuit 1300 and the fourth operation circuit 500, and comprises a ninth input end 1410, a tenth input end 1420 and an eleventh output end 1430. The ninth input end 1410 is configured to receive the fifth operation result from the fifth operation circuit 1300, the tenth input end 1420 is configured to receive the second operation result, and the eleventh output end 1430 is connected to the fourth operation circuit 500.

The fifth data allocator 1500 is connected between the third operation circuit 300 and the fifth operation circuit 1300 and comprises an eleventh input end 1510, a twelfth output end 1520 and a thirteenth output end 1530. The eleventh input end 1510 is configured to receive the third operation result, the twelfth output end 1520 is the twelfth input end 1610 of the fourth data selector, and the thirteenth output end 1530 is connected to the fifth operation circuit 1300.

The fourth data selector 1600 includes a twelfth input end 1610, a thirteenth input end 1620, and a fourteenth output end 1630. The twelfth input end 1610 is connected to the twelfth output end 1520, the thirteenth input end 1620 is configured to receive the fourth operation result, and the fourteenth output end 1630 is configured to directly output the received operation result.

The fourth operation circuit 500 is further configured to, upon receiving the fifth operation result, execute a fourth operation on the fifth operation result to output the fourth operation result.

In the above-mentioned embodiments, by providing a fifth operation circuit, a third data selector, a fifth data allocator and a fourth data selector, the first operation circuit and the second operation circuit can share the third operation circuit so as to reduce power consumption; the functions of the third operation circuit and the fourth operation circuit are respectively used to improve the operation performance; the third operation circuit, the fifth operation circuit, and the fourth operation circuit can also be shared in sequence to meet more computational requirements.

Figure 7:
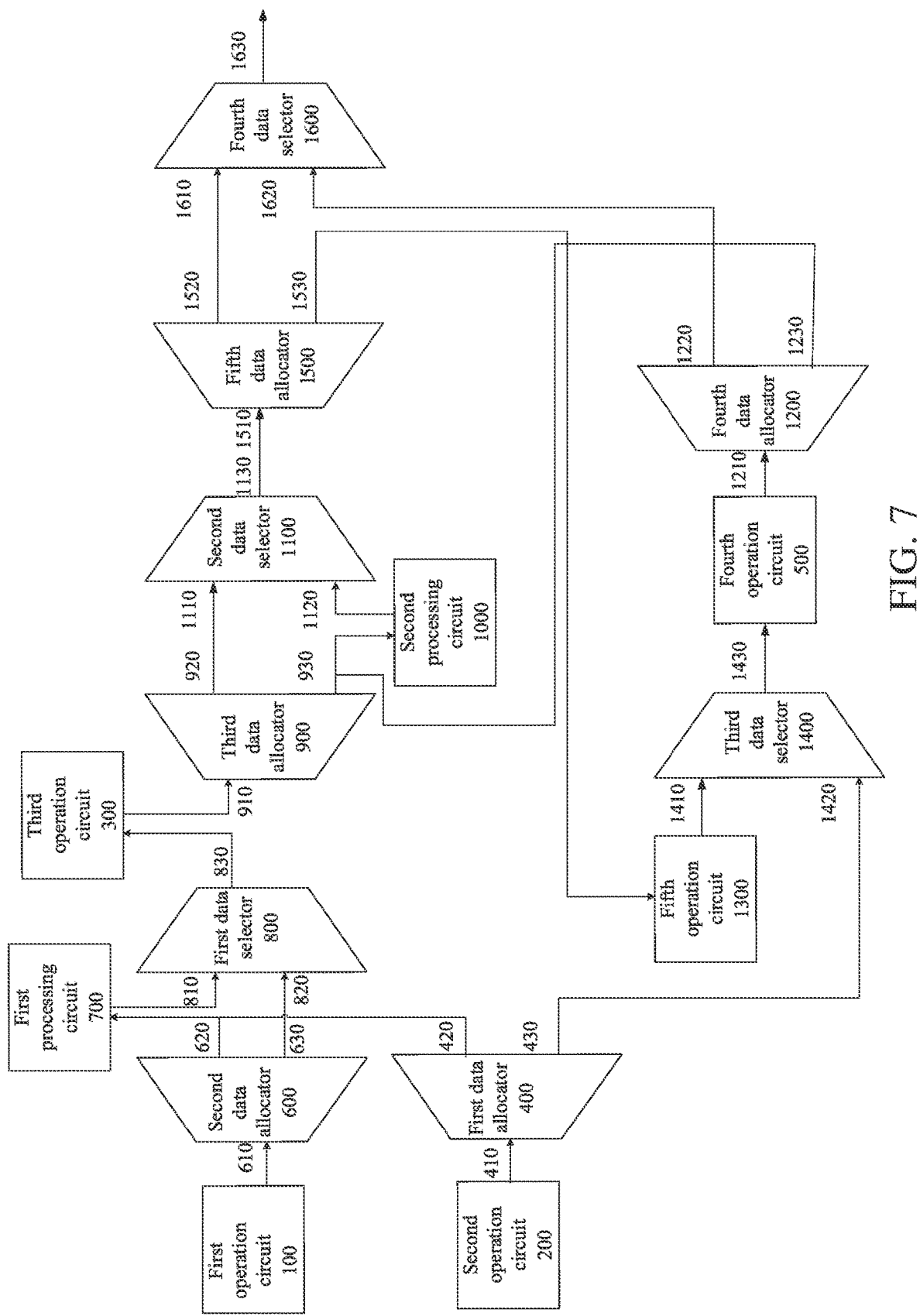
FIG. 7 is a schematic diagram of a structure of an artificial intelligence chip according to further embodiments of the present disclosure.

FIG. 7 is a schematic diagram of a structure of an artificial intelligence chip according to further embodiments of the present disclosure.

As shown in FIG. 7, the artificial intelligence chip 10 includes a first operation circuit 100, a second operation circuit 200, a first data allocator 400, a second data allocator 600, a first processing circuit 700, a first data selector 800, a third operation circuit 300, a third data allocator 900, a second processing circuit 1000, a second data selector 1100, a fifth data allocator 1500, a fifth operation circuit 1300, a third data selector 1400, a fourth operation circuit 500, a fourth data allocator 1200, and a fourth data selector 1600.

The first operation circuit 100 is configured to execute a first operation to output a first operation result. For example, the first operation is a convolution operation.

The second operation circuit 200 is connected in parallel with the first operation circuit 100 and is configured to execute a second operation identical to the first operation to output a second operation result. For example, both the first operation and the second operation are convolution operations.

The first data allocator 400 includes a first input end 410, a first output end 420, and a second output end 430. The first input end 410 is configured to receive a second operation result and the first output end 420 is connected to the first processing circuit 700. The second output end 430 is connected to a third data selector 1400.

The second data allocator 600 is connected between the first operation circuit 100 and the third operation circuit 300 and comprises a second input end 610, a third output end 620 and a fourth output end 630. The second input end 610 is configured to receive a first operation result. The third output end 620 is connected to the first processing circuit 700 and the fourth output end 630 is connected to the first data selector 800.

The first processing circuit 700 is connected between the second data allocator 600 and the third operation circuit 300, is configured to receive the first operation result from the third output end 620 and the second operation result from the first output end 420 in one clock cycle, and to output the first operation result and the second operation result in two clock cycles, respectively.

The first data selector 800 is connected between the first processing circuit 700 and the third operation circuit 300, and comprises a third input end 810, a fourth input end 820 and a fifth output end 830, wherein the third input end 810 is connected to the first processing circuit 700, the fourth input end 820 is connected to the fourth output end 630, and the fifth output end 830 is connected to the third operation circuit 300.

The third operation circuit 300 is configured to, upon receiving the first operation result and the second operation result, execute a third operation different from the first operation on the first operation result and the second operation result, respectively, to output the third operation result, respectively. The third operation circuit 300 is further configured to execute a third operation on the first operation result if only the first operation result is received. The third operation is, for example, an activation function operation.

The third data allocator 900 comprises a fifth input end 910, a sixth output end 920 and a seventh output end 930, the fifth input end 910 being configured to receive a third operation result.

The second processing circuit 1000 is configured to receive the third operation result from the seventh output end 930 and the fourth operation result from the fourth operation circuit 500 in one clock cycle and output the third operation result and the fourth operation result respectively in two clock cycles, or to receive the third operation result from the seventh output end 930 and the fourth operation result from the fourth operation circuit 500 in one clock cycle and output the third operation result and the fourth operation result synchronously in one clock cycle.

The second data selector 1100 comprises a sixth input end 1110, a seventh input end 1120 and an eighth output end 1130. The sixth input end 1110 is connected to the sixth output end 920, and the seventh input end 1120 is configured to receive the third operation result and the fourth operation result output by the second processing circuit 1000. The eighth output end 1130 is connected to an eleventh input end 1510 of a fifth data allocator 1500.

The fifth data allocator 1500 is connected between the third operation circuit 300 and the fifth operation circuit 1300 and comprises an eleventh input end 1510, a twelfth output end 1520 and a thirteenth output end 1530. The eleventh input end 1510 is configured to receive the third operation result, the twelfth output end 1520 is connected to the fourth data selector 1600, and the thirteenth output end 1530 is connected to the fifth operation circuit 1300.

The fifth operation circuit 1300 is connected between the third operation circuit 300 and the fourth operation circuit 500, and is configured to execute a fifth operation on the third operation result to output a fifth operation result, the fifth operation being different from the first operation and different from the third operation. For example, the first operation is a convolution operation, the third operation is an activation function operation, and the fifth operation includes at least one of a dot multiplication and a dot addition operation.

The third data selector 1400 is connected between the fifth operation circuit 1300 and the fourth operation circuit 500, and comprises a ninth input end 1410 configured to receive the fifth operation result, a tenth input end 1420 configured to receive the second operation result, and an eleventh output end 1430 connected to the fourth operation circuit 500.

The fourth operation circuit 500 is connected to the eleventh output end 1510 and configured to, upon receiving the second operation result, execute a fourth operation on the second operation result to output a fourth operation result, the fourth operation being identical to the third operation. The fourth operation circuit 500 is further configured to, upon receiving the fifth operation result, execute a fourth operation on the fifth operation result to output the fourth operation result. For example, the fourth operation is an activate function operation.

The fourth data allocator 1200 comprises an eighth input end 1210, a ninth output end 1220 and a tenth output end 1230, the eighth input end 1210 being configured to receive the fourth operation result, the tenth output end 1230 being connected to an end, close to the third data allocator 900, of the second processing circuit 1000. The ninth output end 1220 is connected to a fourth data selector 1600.

The fourth data selector 1600 comprises a twelfth input end 1610, a thirteenth input end 1620 and a fourteenth output end 1630, wherein the twelfth input end 1610 is connected to the twelfth output end 1520, and the thirteenth input end 1620 is connected to the ninth output end 1220, and is configured to receive a fourth operation result. The fourteenth output end 1630 is configured to directly output the received operation result.

It will be appreciated that the first data allocator 400, the second data allocator 600, the third data allocator 900, the fourth data allocator 1200, the fifth data allocator 1500, the first data selector 800, the second data selector 1100, the third data selector 1400, the fourth data selector 1600, the first processing circuit 700, and the second processing circuit 1000 may be controlled by control signals to select respective paths or modes of operation of the processing circuits to execute a variety of functions.

For example, a first controller (not shown) may be provided to control the first data allocator 400, the second data allocator 600, the third data allocator 900, the fourth data allocator 1200, the first data selector 800, the second data selector 1100, the third data selector 1400, the first processing circuit 700 and the second processing circuit 1000, and a second controller (not shown) may be provided to control the fifth data allocator 1500 and the fourth data selector 1600.

As another example, each data allocator, data selector, and processing circuit may be individually controlled by a controller.

Some operational scenarios of the artificial intelligence chip 10 shown in FIG. 7 are described below.

First, a first working scenario is introduced.

The first operation circuit 100 executes a convolution operation and outputs the first operation result to the second input end 610 of the second data allocator 600. The second data allocator 600 outputs the first operation result from the third output end 620 to the first processing circuit 700.

The second operation circuit 200 also executes a convolution operation and outputs a second operation result to the first data allocator 400. The first data allocator 400 outputs the second operation result from the first output end 420 to the first processing circuit 700.

The first processing circuit 700 receives the first operation result and the second operation result in one clock cycle, and outputs the first operation result and the second operation result to the third operation circuit 300 in two clock cycles, respectively.

The first data selector 800 receives the first operation result and the second operation result from the third input end 810 and outputs the first operation result and the second operation result to the third operation circuit 300 from the fifth output end 830, respectively.

The third operation circuit 300 executes activation function operations on the first operation result and the second operation result, respectively, to output third operation results, respectively. The third data allocator 900 outputs the third operation result from the sixth output end 920.

The second data selector 1100 receives the third operation result from the sixth input end 1110 and outputs same to the eleventh input end 1510 of the fifth data allocator 1500. The fifth data allocator 1500 outputs the third operation result from the twelfth output end 1520 to the twelfth input end 1610 of the fourth data selector 1600. The fourth data selector 1600 directly outputs the third operation result from the fourteenth output end 1630.

In the above-mentioned working scenario, the first operation circuit and the second operation circuit which execute the convolution operation share a third operation circuit which executes the activation function operation, the use of the operation circuit which activates the function operation is saved, and the power consumption required for the operation can be reduced.

Next, a second working scenario is described.

The first operation circuit 100 executes a convolution operation and outputs the first operation result to the second data allocator 600. The second data allocator 600 outputs the first operation result from the fourth output end 630 to the fourth input end 820 of the first data selector 800. The first data selector 800 outputs the first operation result from the fifth output end 830 to the third operation circuit 300, and the third operation circuit 300 executes an activation function operation on the first operation junction to output the third operation result to the fifth input end 910 of the third data allocator 900. The third data allocator 900 outputs the third operation result from the seventh output end 930 to the second processing circuit 1000. The second operation circuit 200 executes a convolution operation and outputs a second operation result to the first input end 410 of the first data allocator 400. The first data allocator 400 outputs the second operation result from the second output end 430 to the tenth input end 1420 of the third data selector 1400. The third data selector 1400 outputs the second operation result from the eleventh output end 1430 to the fourth operation circuit 500.

The fourth operation circuit 500 executes an activation function operation on the second operation result to output the fourth operation result to the eighth input end 1210 of the fourth data allocator 1200.

The fourth data allocator outputs the fourth operation result from the tenth output end 1230 to the second processing circuit 1000.

The second processing circuit 1000 receives the third operation result and the fourth operation result in one clock cycle, and outputs the third operation result and the fourth operation result synchronously to the seventh input end 1120 of the second data selector 1100 in one clock cycle.

The second data selector 1100 outputs the first operation result and the fourth operation result to an eleventh input end 1510 of the fifth data allocator 1500. The fifth data allocator 1500 outputs the first operation result and the fourth operation result from the twelfth output end 1520 to the twelfth input end 1610 of the fourth data selector 1600. The fourth data selector 1600 directly outputs the third operation result and the fourth operation result from the fourteenth output end 1630.

In the above-mentioned working scenario, the first operation circuit and the second operation circuit which execute the convolution operation respectively use two third operation circuits and fourth operation circuits which execute the activation function operation, and the two sets of convolution-activation function operations are executed in parallel, which is beneficial to improving the operation speed.

At last, the third working scenario is introduced.

The first operation circuit 100 executes a convolution operation and outputs the first operation result to the second input end 610 of the second data allocator 600. The second data allocator 600 outputs the first operation result from the third output end 620 to the first processing circuit 700.

The second operation circuit 200 also executes a convolution operation and outputs a second operation result to the first data allocator 400. The first data allocator 400 outputs the second operation result from the first output end 420 to the first processing circuit 700.

The first processing circuit 700 receives the first operation result and the second operation result in one clock cycle, and outputs the first operation result and the second operation result to the third operation circuit 300 in two clock cycles, respectively.

The first data selector 800 receives the first operation result and the second operation result from the third input end 810 and outputs the first operation result and the second operation result to the third operation circuit 300 from the fifth output end 830, respectively.

The third operation circuit 300 is configured to execute activation function operations on the first operation result and the second operation result, respectively, to output a third operation result, respectively. The third data allocator 900 outputs the third operation result from the sixth output end 920.

The second data selector 1100 receives the third operation result from the sixth input end 1110 and outputs same to the eleventh input end 1510 of the fifth data allocator 1500. The fifth data allocator 1500 outputs the third operation result from the thirteenth output end 1530 to the fifth operation circuit 1300. The fifth operation circuit 1300 executes at least one of a dot multiplication and a dot addition operation on the third operation result to output the fifth operation result to the ninth input end 1410 of the third data selector 1400.

The third data selector 1400 outputs the fifth operation result from the eleventh output end 1430 to the fourth operation circuit 500. The fourth operation circuit 500 executes an activation function operation on the fifth operation result to output the fourth operation result to the eighth input end 1210 of the fourth data allocator 1200. The fourth data allocator 1200 outputs the result of the fourth operation from the ninth output end 1220 to the thirteenth input end 1620 of the fourth data selector 1600. The fourth data selector 1600 directly outputs the result of the fourth operation from the fourteenth output end 1630.

In the above-mentioned working scenario, the first operation circuit and the second operation circuit which execute a convolution operation share a third operation circuit which executes an activation function operation, a fifth operation circuit which executes at least one of a dot multiplication and a dot addition, and a fourth operation circuit which executes an activation function operation, so as to satisfy specific operation requirements.

In the above-mentioned embodiments, the controller is used to control the data selector and the data allocator, three different working scenarios can be realized with less hardware, some working scenarios can save power consumption, some working scenarios can improve performance, and other working scenarios can satisfy specific operation requirements, and the switching between the three functions is simple and convenient, and easy to operate.

Embodiments of the present disclosure also provide an artificial intelligence accelerator that may include an artificial intelligence chip, such as artificial intelligence chip 10, as described in any of the embodiments above.

Various embodiments are described in this specification in a progressive manner, with each embodiment focusing on differences from the other embodiments, and with reference to the same or similar parts of the various embodiments. With respect to the method embodiment, since it substantially corresponds to the chip embodiment, the description is relatively simple, with reference to the partial description of the chip embodiment.

Figure 8:
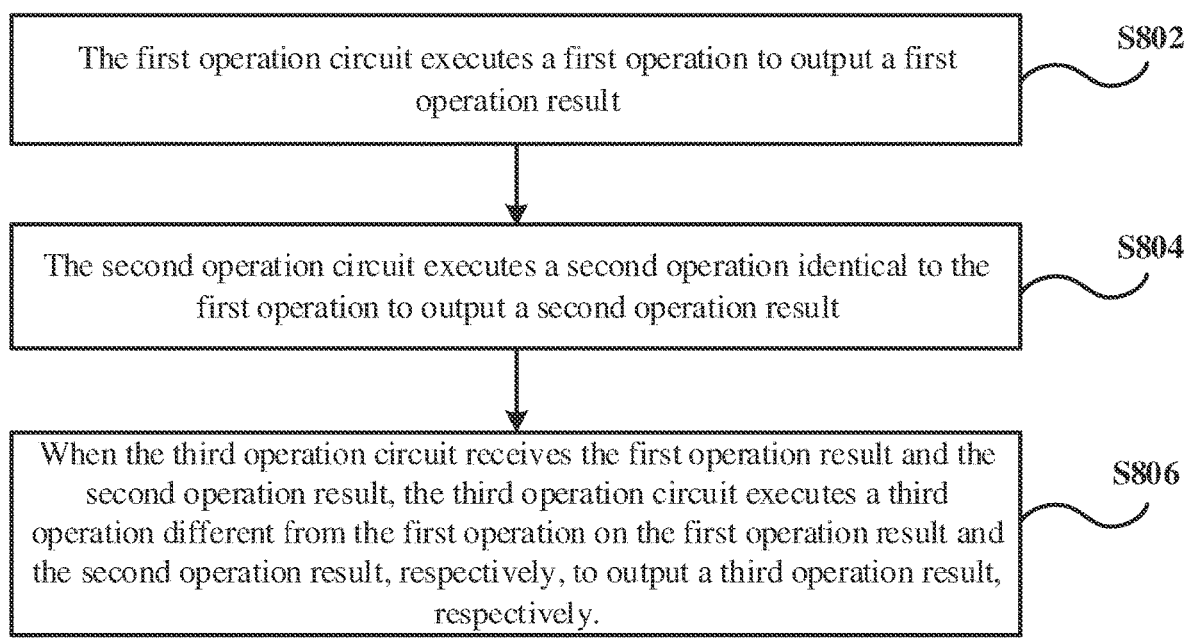
FIG. 8 is a flow diagram of an operation method of an artificial intelligence chip according to some embodiments of the present disclosure.

FIG. 8 is a flow diagram of an operation method of an artificial intelligence chip according to some embodiments of the present disclosure.

The artificial intelligence chip 10 may include a first operation circuit 100, a second operation circuit 200, and a third operation circuit 300.

As shown in FIG. 8, in step S802, the first operation circuit 100 executes a first operation to output a first operation result.

In step S804, the second operation circuit 200 executes a second operation identical to the first operation to output a second operation result. Further, the second operation circuit 200 is connected in parallel with the first operation circuit 100.

In step S806, the third operation circuit 300, upon receiving the first operation result and the second operation result, executes a third operation different from the first operations on the first operation result and the second operation result, respectively, to output a third operation result, respectively.

In the above-described embodiment, the third operation circuit 300 is shared by the first operation circuit 100 and the second operation circuit 200, so that the operation requirements can be satisfied and the power consumption can be reduced.

In some embodiments, artificial intelligence chip 10 includes first data allocator 400 and fourth operation circuit 500 in addition to first operation circuit 100, second operation circuit 200, and third operation circuit 300.

The first data allocator 400 includes a first input end 410, a first output end 420, and a second output end 430. The first data allocator 400 receives the second operation result via the first input end 410 and outputs the second operation result via the first output end 420 or the second output end 430. Here, the first output end 420 is connected to the third operation circuit 300. The second output end 430 is connected to the fourth operation circuit 500.

The fourth operation circuit 500, upon receiving the second operation result, executes a fourth operation on the second operation result to output the fourth operation result. Here, the fourth operation is identical to the third operation. For example, both the fourth operation and the third operation are activation function operations.

When only the first operation result is received, the third operation circuit 300 executes a third operation on the first operation result.

For example, when the second operation result received by the first input end 410 is output via the first output end 420, the third operation circuit 300 executes a third operation on the first operation result and the second operation result, respectively; when the second operation result received by the first input end 410 is output via the second output end 430, the third operation circuit 300 executes a third operation on the first operation result, and the fourth operation circuit 500 executes a fourth operation on the second operation result.

In the above-described embodiment, the first operation circuit and the second operation circuit may share the function of the third operation circuit to reduce power consumption, or may respectively use the functions of the third operation circuit and the fourth operation circuit to improve computational performance. Such an operation method of artificial intelligence chip 10 can satisfy different computing requirements.

In some embodiments, the artificial intelligence chip 10, in addition to the first operation circuit 100, the second operation circuit 200, the third operation circuit 300, first data allocator 400, and the fourth operation circuit 500, further includes the second data allocator 600, the first processing circuit 700 and the first data selector 800.

The second data allocator 600 includes a second input end 610, a third output end 620, and a fourth output end 630. The second data allocator 600 receives the first operation result via the second input end 610 and outputs the first operation result via the third output end 620. Here, the second data allocator 600 is connected between the first operation circuit 100 and the third operation circuit 300.

The first processing circuit 700 receives the first operation result from the third output end 620 and the second operation result from the first output end 420 in one clock cycle, and outputs the first operation result and the second operation result in two clock cycles, respectively. Here, the first processing circuit 700 is connected between the second data allocator 600 and the third operation circuit 300. The first processing circuit 700 is, for example, a bit-width conversion circuit.

For example, the first processing circuit 700 may receive a first operation result and a second operation result in one clock cycle, and may output the first operation result in a first one of the two clock cycles and the second operation result in a second one of the two clock cycles.

The first data selector 800 comprises a third input end 810, a fourth output end 630 and a fifth output end 830. The first data selector 800 receives the first operation result and the second operation result output from the first processing circuit 700 via the third input end 810, and outputs the first operation result and the second operation result to the third operation circuit 300 via the fifth output end 830.

In the above-mentioned embodiment, the first processing circuit 700 is provided so as to enable the third operation circuit 300 to receive the first operation result and the second operation result in a certain order of precedence, so as to avoid data congestion, thereby ensuring the normal operation of the third operation circuit 300.

In some embodiments, when the third operation circuit 300 receives only the first operation result, the second data allocator 600 receives the first operation result via the second input end 610 and outputs the first operation result via the fourth output end 630. The first data selector 800 receives the first operation result via the fourth input end 820 and outputs the first operation result to the third operation circuit 300 via the fifth output end 830.

In some embodiments, the artificial intelligence chip 10, in addition to first operation circuit 100, second operation circuit 200, third operation circuit 300, fourth operation circuit 500, and first data allocator 400, further includes a third data allocator 900, a second processing circuit 1000, and a second data selector 1100.

The third data allocator 900 comprises a fifth input end 910, a sixth output end 920 and a seventh output end 930. The third data allocator 900 receives the third operation result via the fifth input end 910 and outputs the third operation result via the sixth output end 920 or the seventh output end 930. Here, the sixth output end 920 is connected to the sixth input end 1110 of the second data selector 1100, and the seventh output end 930 is connected to the second processing circuit 1000.

The second processing circuit 1000 receives the third operation result from the seventh output end 930 and the fourth operation result from the fourth operation circuit 500 in one clock cycle and outputs the third operation result and the fourth operation result in two clock cycles, respectively, or receives the third operation result from the seventh output end 930 and the fourth operation result from the fourth operation circuit 500 in one clock cycle and outputs the third operation result and the fourth operation result synchronously in one clock cycle. For example, the second processing circuit 1000 receives the third operation result and the fourth operation result in one clock cycle, and may output the third operation result in a first clock cycle of the two clock cycles and output the fourth operation result in a second clock cycle of the two clock cycles. As another example, the second processing circuit 1000 may receive the third operation result and the fourth operation result in one clock cycle, concatenate the third operation result and the fourth operation result, and output the third operation result and the fourth operation result synchronously in one clock cycle. The second processing circuit 1000 is, for example, a bit-width conversion circuit.

The second data selector 1100 comprises a sixth input end 1110, a seventh input end 1120 and an eighth output end 1130. The second data selector 1100 receives the third operation result from the sixth output end 920 via the sixth input end 1110 or the third operation result and the fourth operation result output from the second processing circuit 1000 via the seventh input end 1120, and outputs same via the eighth output end 1130 of the second data selector 1100.

In the above-mentioned embodiments, by providing the second processing circuit 1000, the third operation result and the fourth operation result can be sent in a certain order of precedence in some scenarios, so as to avoid data congestion; in other scenarios, the third and fourth operation circuits can be synchronously output to maximize the performance of the artificial intelligence chip.

In some embodiments, artificial intelligence chip 10, in addition to the first operation circuit 100, the second operation circuit 200, the third operation circuit 300, the fourth operation circuit 500, the first data allocator 400, the third data allocator 900, the second processing circuit 1000, and the second data selector 1100, further includes a fourth data allocator 1200.

The fourth data allocator 1200 comprises an eighth input end 1210, a ninth output end 1220 and a tenth output end 1230. The fourth data allocator 1200 receives the fourth operation result via the eighth input end 1210 and outputs the fourth operation result via the ninth output end 1220 or the tenth output end 1230, the ninth output end 1220 being capable of directly outputting the fourth operation result, and the tenth output end 1230 is connected to one end, close to the third data allocator 900, of the second processing circuit 1000.

In the above-mentioned embodiments, the fourth operation result may be output to the second processing circuit 1000 via the tenth output end 1230, or the fourth operation result may be directly output via the ninth output end 1220, further extending the operation function of the artificial intelligence chip 10.

In some embodiments, the artificial intelligence chip 10, in addition to the first operation circuit 100, the second operation circuit 200, the third operation circuit 300, the fourth operation circuit 500, and first data allocator 400, further includes a fifth data allocator 1500, a fifth operation circuit 1300, a fourth data selector 1600, and a third data selector 1400.

The fifth data allocator 1500 includes an eleventh input end 1510, a twelfth output end 1520, and a thirteenth output end 1530. The fifth data allocator 1500 receives the third operation result from the third operation circuit 300 via the eleventh input end 1510 and outputs it via the twelfth output end 1520 or the thirteenth output end 1530.

The fifth operation circuit 1300 executes a fifth operation on the third operation result from the thirteenth output end 1530 to output a fifth operation result, which is different from the first operation and different from the third operation. In some embodiments, the first operation is one of a first type of operation and a second type of operation, the fifth operation is the other of the first type of operation and the second type of operation, and the third operation is an activate function operation. Here, the first type of operation is a convolution operation, and the second type of operation includes at least one of a dot multiplication operation and a dot addition operation. For example, the fifth operation includes at least one of a dot multiplication operation and a dot addition operation.

The third data selector 1400 comprises a ninth input end 1410, a tenth input end 1420 and an eleventh output end 1430. The third data selector 1400 receives a fifth operation result from the fifth operation circuit 1300 via the ninth input end 1410 or a second operation result from the second output end 430 via the tenth input end 1420 and outputs same to the fourth operation circuit 500 via the eleventh output end 1430.

The fourth operation circuit 500 is further configured to, upon receiving the fifth operation result, execute a fourth operation on the fifth operation result to output the fourth operation result.

The fourth data selector 1600 receives the third operation result from the twelfth output end 1520 via the twelfth input end 1610 or the fourth operation result from the fourth operation circuit 500 via the thirteenth input end 1620, and outputs it via the fourteenth output end 1630.

In the above-mentioned embodiments, the first operation circuit and the second operation circuit may share a third operation circuit to reduce power consumption; the functions of the third operation circuit and the fourth operation circuit are respectively used to improve the operation performance; the third operation circuit, the fifth operation circuit, and the fourth operation circuit can also be shared to meet more computational requirements.

Thus far, various embodiments of the present disclosure have been described in detail. To avoid obscuring the concepts of the present disclosure, some details known in the art are not described. From the foregoing description, those skilled in the art will fully understand how to implement the technical solutions disclosed herein.

While specific embodiments of the disclosure have been described in detail by way of example, it will be understood by those skilled in the art that the foregoing examples are illustrative only and are not intended to limit the scope of the disclosure. It will be appreciated by those skilled in the art that changes may be made to the foregoing embodiments or equivalents may be substituted for elements thereof without departing from the scope and spirit of the disclosure. The scope of the disclosure is defined by the appended claims.

The invention claimed is:

1. An artificial intelligence chip, comprising:
   a first operation circuit configured to execute a first operation to output a first operation result;
   a second operation circuit connected in parallel with the first operation circuit and configured to execute a second operation identical to the first operation to output a second operation result; and
   a third operation circuit configured to, upon receiving the first operation result and the second operation result, execute a third operation different from the first operation on the first operation result and the second operation result, respectively, to output a third operation result, respectively;
   the artificial intelligence chip further comprising:
   a first data allocator comprising: a first input end configured to receive the second operation result, a first output end connected to the third operation circuit, and a second output end, a fourth operation circuit connected to the second output end and configured to, upon receiving the second operation result, execute a fourth operation on the second operation result to output a fourth operation result, the fourth operation being identical to the third operation;
   the third operation circuit being further configured to execute the third operation on the first operation result if only the first operation result is received;
   a second data allocator, connected between the first operation circuit and the third operation circuit, comprising a second input end, a third output end and a fourth output end, the second input end being configured to receive the first operation result;
   a first processing circuit connected between the second data allocator and the third operation circuit and configured to receive the first operation result from the third output end and the second operation result from the first output end in one clock cycle and respectively output the first operation result and the second operation result to the third operation circuit in two clock cycles; and
   a first data selector connected between the first processing circuit and the third operation circuit, comprising a third input end, a fourth input end and a fifth output end, the third input end being connected to the first processing circuit, the fourth input end being connected to the fourth output end, and the fifth output end being connected to the third operation circuit.

2. The artificial intelligence chip of claim 1, further comprising:
   a third data allocator comprising: a fifth input end, a sixth output end and a seventh output end, the fifth input end being configured to receive the third operation result;
   a second processing circuit configured to receive the third operation result from the seventh output end and the fourth operation result from the fourth operation circuit in one clock cycle, and output the third operation result and the fourth operation result respectively in two clock cycles, or output the third operation result and the fourth operation result synchronously in one clock cycle; and
   a second data selector comprising a sixth input end, a seventh input end and an eighth output end, the sixth input end being connected to the sixth output end, the seventh input end being configured to receive the third operation result and the fourth operation result output by the second processing circuit.

3. The artificial intelligence chip of claim 2, further comprising:
   a fourth data allocator comprising an eighth input end, a ninth output end and a tenth output end, the eighth input end being configured to receive the fourth operation result, the tenth output end being connected to an end, close to the third data allocator, of the second processing circuit.

4. The artificial intelligence chip of claim 1, further comprising:
   a fifth operation circuit connected between the third operation circuit and the fourth operation circuit and configured to execute a fifth operation on the third operation result to output a fifth operation result, the fifth operation being different from the first operation and different from the third operation;
   a third data selector connected between the fifth operation circuit and the fourth operation circuit and comprising a ninth input end, a tenth input end and an eleventh output end, the ninth input end being configured to receive the fifth operation result, the tenth input end being configured to receive the second operation result, the eleventh output end being connected to the fourth operation circuit;
   a fifth data allocator connected between the third operation circuit and the fifth operation circuit, comprising an eleventh input end, a twelfth output end and a thirteenth output end, the eleventh input end being configured to receive the third operation result, the thirteenth output end being connected to the fifth operation circuit;
   a fourth data selector comprising a twelfth input end, a thirteenth input end and a fourteenth output end, the twelfth input end being connected to the twelfth output end, the thirteenth input end being configured to receive the fourth operation result; and
   the fourth operation circuit being further configured to, upon receiving the fifth operation result, execute the fourth operation on the fifth operation result to output the fourth operation result.

5. The artificial intelligence chip of claim 1, further comprising:
   a fifth operation circuit connected between the third operation circuit and the fourth operation circuit and configured to execute a fifth operation on the third operation result to output a fifth operation result, the fifth operation being different from the first operation and different from the third operation;
a third data selector connected between the fifth operation circuit and the fourth operation circuit and comprising a ninth input end, a tenth input end and an eleventh output end, the ninth input end being configured to receive the fifth operation result, the tenth input end being configured to receive the second operation result, the eleventh output end being connected to the fourth operation circuit;
a fifth data allocator connected between the third operation circuit and the fifth operation circuit, comprising an eleventh input end, a twelfth output end and a thirteenth output end, the eleventh input end being configured to receive the third operation result, the thirteenth output end being connected to the fifth operation circuit;
a fourth data selector comprising a twelfth input end, a thirteenth input end and a fourteenth output end, the twelfth input end being connected to the twelfth output end, the thirteenth input end being configured to receive the fourth operation result; and
the fourth operation circuit being further configured to, upon receiving the fifth operation result, execute the fourth operation on the fifth operation result to output the fourth operation result.

6. The artificial intelligence chip of claim 2, further comprising:
a fifth operation circuit connected between the third operation circuit and the fourth operation circuit and configured to execute a fifth operation on the third operation result to output a fifth operation result, the fifth operation being different from the first operation and different from the third operation;
a third data selector connected between the fifth operation circuit and the fourth operation circuit and comprising a ninth input end, a tenth input end and an eleventh output end, the ninth input end being configured to receive the fifth operation result, the tenth input end being configured to receive the second operation result, the eleventh output end being connected to the fourth operation circuit;
a fifth data allocator connected between the third operation circuit and the fifth operation circuit, comprising an eleventh input end, a twelfth output end and a thirteenth output end, the eleventh input end being configured to receive the third operation result, the thirteenth output end being connected to the fifth operation circuit;
a fourth data selector comprising a twelfth input end, a thirteenth input end and a fourteenth output end, the twelfth input end being connected to the twelfth output end, the thirteenth input end being configured to receive the fourth operation result; and
the fourth operation circuit being further configured to, upon receiving the fifth operation result, execute the fourth operation on the fifth operation result to output the fourth operation result.

7. The artificial intelligence chip of claim 3, further comprising:
a fifth operation circuit connected between the third operation circuit and the fourth operation circuit and configured to execute a fifth operation on the third operation result to output a fifth operation result, the fifth operation being different from the first operation and different from the third operation;
a third data selector connected between the fifth operation circuit and the fourth operation circuit and comprising a ninth input end, a tenth input end and an eleventh output end, the ninth input end being configured to receive the fifth operation result, the tenth input end being configured to receive the second operation result, the eleventh output end being connected to the fourth operation circuit;
a fifth data allocator connected between the third operation circuit and the fifth operation circuit, comprising an eleventh input end, a twelfth output end and a thirteenth output end, the eleventh input end being configured to receive the third operation result, the thirteenth output end being connected to the fifth operation circuit;
a fourth data selector comprising a twelfth input end, a thirteenth input end and a fourteenth output end, the twelfth input end being connected to the twelfth output end, the thirteenth input end being configured to receive the fourth operation result; and
the fourth operation circuit being further configured to, upon receiving the fifth operation result, execute the fourth operation on the fifth operation result to output the fourth operation result.

8. The artificial intelligence chip of claim 4, wherein:
the first operation is one of a first type of operation and a second type of operation, the fifth operation is the other of the first type of operation and the second type of operation, the third operation is an activation function operation, the first type of operation is a convolution operation, and the second type of operation comprises at least one of a dot multiplication operation and a dot addition operation.

9. The artificial intelligence chip of claim 8, wherein the first operation is the first type of operation and the fifth operation is the second type of operation.

10. An artificial intelligence accelerator, comprising:
the artificial intelligence chip of claim 1.

11. An artificial intelligence accelerator, comprising:
the artificial intelligence chip of claim 4.

12. An operation method of an artificial intelligence chip, the artificial intelligence chip comprising a first operation circuit, a second operation circuit and a third operation circuit, the method comprising:
the first operation circuit executes a first operation to output a first operation result;
the second operation circuit executes a second operation identical to the first operation to output a second operation result, the second operation circuit being connected in parallel with the first operation circuit; and
the third operation circuit, upon receiving the first operation result and the second operation result, respectively executing a third operation different from the first operation on the first operation result and the second operation result to respectively output a third operation result;
the artificial intelligence chip further comprising a first data allocator and a fourth operation circuit, the method further comprising:
the first data allocator receiving the second operation result via a first input end and outputting the second operation result via a first output end or a second output end, the first output end being connected to the third operation circuit;
the fourth operation circuit, upon receiving the second operation result, executing a fourth operation on the second operation result to output a fourth operation result, the fourth operation being identical to the third operation, and the fourth operation circuit being connected to the second output end; and the third operation circuit executing the third operation on the first operation result when only the first operation result is received;

the artificial intelligence chip further comprising a second data allocator, a first processing circuit and a first data selector, when the third operation circuit receives the first operation result and the second operation result, the method further comprises:

a second data allocator receiving the first operation result via a second input end and outputting the first operation result via a third output end, the second data allocator being connected between the first operation circuit and the third operation circuit, the first processing circuit receiving the first operation result from the third output end and the second operation result from the first output end in one clock cycle, and outputting the first operation result and the second operation result respectively in two clock cycles, and the first processing circuit being connected between the second data allocator and the third operation circuit, and the first data selector receiving the first operation result and the second operation result output by the first processing circuit via a third input end, and outputting the first operation result and the second operation result to the third operation circuit via a fifth output end.

13. The operation method of claim 12, when the third operation circuit only receives the first operation result, the method further comprising:

the second data allocator receiving the first operation result via the second input end and outputting the first operation result via the fourth output end;

the first data selector receiving the first operation result via the fourth input end and outputting the first operation result to the third operation circuit via the fifth output end.

14. The operation method of claim 12, the artificial intelligence chip further comprising a third data allocator, a second processing circuit and a second data selector, the method further comprising:

the third data allocator receiving the third operation result via a fifth input end and outputting the third operation result via a sixth output end or a seventh output end;

the second processing circuit receiving the third operation result from the seventh output end and the fourth operation result from the fourth operation circuit in one clock cycle, and outputting the third operation result and the fourth operation result respectively in two clock cycles, or outputting the third operation result and the fourth operation result synchronously in one clock cycle; and the second data selector receiving the third operation result from the sixth output end via a sixth input end or receiving the third operation result and the fourth operation result output by the second processing circuit via a seventh input end, and outputting same via an eighth output end of the second data selector.

15. The operation method of claim 14, the artificial intelligence chip further comprising a fourth data allocator, the method further comprising:

the fourth data allocator receiving the fourth operation result via an eighth input end, and outputting the fourth operation result via a ninth output end or a tenth output end, and the tenth output end being connected to one end, close to the third data allocator, of the second processing circuit.

16. The operation method of claim 12, the artificial intelligence chip further comprising a fifth data allocator, a fifth operation circuit, a fourth data selector and a third data selector, the method further comprising:

the fifth data allocator receiving the third operation result from the third operation circuit via an eleventh input end and outputting same via a twelfth output end or the thirteenth output end;

the fifth operation circuit executing a fifth operation on the third operation result from the thirteenth output end to output a fifth operation result, the fifth operation being different from the first operation and different from the third operation;

the third data selector receiving the fifth operation result from the fifth operation circuit via a ninth input end or receiving the second operation result from the second output end via a tenth input end, and outputting same to the fourth operation circuit via an eleventh output end;

the fourth operation circuit, upon receiving the fifth operation result, executing the fourth operation on the fifth operation result to output the fourth operation result; and the fourth data selector receiving the third operation result from the twelfth output end via a twelfth input end or receiving the fourth operation result from the fourth operation circuit via a thirteenth input end, and outputting same via a fourteenth output end.

17. The operation method of claim 16, wherein the first operation is one of a first type of operation and a second type of operation, the fifth operation is the other of the first type of operation and the second type of operation, the third operation is an activation function operation, the first type of operation is a convolution operation, and the second type of operation comprises at least one of a dot multiplication operation and a dot addition operation.

18. The operation method of claim 17, wherein the first operation is the first type of operation and the fifth operation is the second type of operation.

* * * * *